United States Patent
Kim et al.

(10) Patent No.: US 10,556,800 B2
(45) Date of Patent: *Feb. 11, 2020

(54) METHOD OF PREPARING METAL OXIDE-SILICA COMPOSITE AEROGEL AND METAL OXIDE-SILICA COMPOSITE AEROGEL PREPARED THEREBY

(71) Applicant: LG CHEM, LTD., Seoul (KR)

(72) Inventors: Jong Hun Kim, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 163 days.

This patent is subject to a terminal disclaimer.

(21) Appl. No.: 15/743,643

(22) PCT Filed: Dec. 8, 2016

(86) PCT No.: PCT/KR2016/014364
§ 371 (c)(1),
(2) Date: Jan. 10, 2018

(87) PCT Pub. No.: WO2017/099488
PCT Pub. Date: Jun. 15, 2017

(65) Prior Publication Data
US 2018/0208474 A1    Jul. 26, 2018

(30) Foreign Application Priority Data

Dec. 9, 2015 (KR) .................. 10-2015-0175393
Dec. 7, 2016 (KR) .................. 10-2016-0166123

(51) Int. Cl.
*C01B 33/158* (2006.01)
*C01F 5/02* (2006.01)
(Continued)

(52) U.S. Cl.
CPC .............. *C01B 33/158* (2013.01); *B01J 31/02* (2013.01); *C01B 33/1585* (2013.01); *C01F 5/02* (2013.01);
(Continued)

(58) Field of Classification Search
CPC . C01B 33/1585; C01B 33/159; C01B 33/158; B01J 13/0091; C01F 11/02;
(Continued)

(56) References Cited

U.S. PATENT DOCUMENTS 3,131,072 A    4/1964  Taulli
3,977,993 A    8/1976  Lynch
(Continued)

FOREIGN PATENT DOCUMENTS

EP    3305725    4/2018
EP    3305726    4/2018
(Continued)

OTHER PUBLICATIONS

Li et al, "Preparation of Cu—SiO2 composite aerogel by ambient drying and the influence of synthesizing conditions on the structure of the aerogel," Chinese Science Bulletin 56(7): 685-690 (2011).
(Continued)

*Primary Examiner* — Anthony J Zimmer
(74) *Attorney, Agent, or Firm* — Dentons US LLP

(57) ABSTRACT

The present invention relates to a method of preparing a metal oxide-silica composite aerogel containing a high ratio of a metal oxide and a metal oxide-silica composite aerogel prepared thereby. The method of preparing a metal oxide-silica composite aerogel according to the present invention may adjust a metal oxide ratio to a high level while easily forming a uniform network structure by performing a primary reaction under an acidic condition and a secondary reaction under a basic condition, and thus, since the prepared
(Continued)

metal oxide-silica composite aerogel may contain a high ratio of the metal oxide, mechanical properties may not only be excellent, but high specific surface area and low tap density characteristics may also be exhibited.

18 Claims, 2 Drawing Sheets

(51) Int. Cl.
*B01J 31/02* (2006.01)
*C01F 11/02* (2006.01)

(52) U.S. Cl.
CPC .......... *C01F 11/02* (2013.01); *C01P 2006/11* (2013.01); *C01P 2006/12* (2013.01)

(58) Field of Classification Search
CPC .... C01F 5/02; C01P 2006/16; C01P 2006/12; C01P 2006/11; C01P 2004/61
See application file for complete search history.

(56) References Cited

U.S. PATENT DOCUMENTS

| | | | |
|---|---|---|---|
| 4,717,718 A * | 1/1988 | Eckenhoff | A61M 31/002 424/438 |
| 6,004,436 A * | 12/1999 | Ayers | G01N 21/6428 204/157.15 |
| 6,210,751 B1 | 4/2001 | Schwertfeger | |
| 2003/0103889 A1* | 6/2003 | Mirsky | B01J 21/063 423/326 |
| 2007/0119344 A1* | 5/2007 | Yeung | B01J 13/0091 106/287.34 |
| 2008/0034968 A1 | 2/2008 | Nordberg et al. | |
| 2009/0001014 A1 | 1/2009 | Hua et al. | |
| 2011/0000370 A1 | 1/2011 | Norberg et al. | |
| 2013/0106008 A1 | 5/2013 | Ahn et al. | |
| 2015/0225630 A1 | 8/2015 | Hosoi et al. | |
| 2016/0264427 A1 | 9/2016 | Oh et al. | |
| 2017/0305749 A1* | 10/2017 | Jeon | C01B 33/158 |
| 2018/0002182 A1* | 1/2018 | Jeon | B01J 13/0091 |
| 2018/0127277 A1* | 5/2018 | Kim | B01J 19/12 |
| 2018/0127278 A1 | 5/2018 | Kim et al. | |
| 2018/0127279 A1 | 5/2018 | Kim et al. | |
| 2018/0193825 A1* | 7/2018 | Kim | B01J 21/02 |

FOREIGN PATENT DOCUMENTS

| | | |
|---|---|---|
| EP | 3305727 | 4/2018 |
| JP | 2014051643 | 3/2014 |
| KR | 10-1999-0067369 | 8/1999 |
| KR | 10-0501758 | 10/2005 |
| KR | 10-2008-0084241 | 9/2008 |
| KR | 10-2010-0090989 | 8/2010 |
| KR | 10-2011-0064986 | 6/2011 |
| KR | 10-2012-0033159 | 4/2012 |
| KR | 10-2015-0003716 | 1/2015 |
| KR | 10-2015-0093123 | 8/2015 |
| WO | 2006071183 | 7/2006 |
| WO | 2009002662 | 12/2008 |

OTHER PUBLICATIONS

Sarawade et al., "Preparation of hydrophobic mesoporous silica powder with a high specific surface area by surface modification of a wet-gel slurry and spray-drying," Powder Technology 197: 288-294 (2010).

You Na Kim et al., "Sol-gel synthesis of sodium silicate and titanium oxychloride based $TiO_2$—$SiO_2$ aerogels and their photocatalytic property under UV irradiation," Chemical Engineering Journal 231: 502-511 (2013).

Supplementary Search Report of European Patent Office in Appl'n No. EP16873353, dated Oct. 23, 2018.

Internatinal Search Report and Written Opinion of PCT/KR2016/014364, dated Mar. 10, 2017.

* cited by examiner

METHOD OF PREPARING METAL OXIDE-SILICA COMPOSITE AEROGEL AND METAL OXIDE-SILICA COMPOSITE AEROGEL PREPARED THEREBY

CROSS-REFERENCE TO RELATED APPLICATIONS

This application is a National Stage Application of International Application No. PCT/KR2016/014364 filed on Dec. 8, 2016, which claims priority to and the benefit of Korean Patent Application Nos. 10-2015-0175393, filed on Dec. 9, 2015, and 10-2016-0166123, filed on Dec. 7, 2016, in the Korean Intellectual Property Office, all of which are incorporated herein in their entirety by reference for all purposes as if fully set forth herein.

TECHNICAL FIELD

The present invention relates to a method of preparing a metal oxide-silica composite aerogel containing a large amount of the metal oxide and a metal oxide-silica composite aerogel prepared thereby.

BACKGROUND ART

Since a silica aerogel, as a high specific area, ultra-porous material having a porosity of about 90% to 99.9% and a pore diameter of about 1 nm to 100 nm, has excellent characteristics such as ultra lightweightness, ultra insulation, and ultra-low dielectric constant, research into the applications of the aerogel as a transparent insulator and an environmentally-friendly high-temperature insulator, an ultra-low dielectric thin film for a highly integrated device, a catalyst and a catalyst support, an electrode for a supercapacitor, and an electrode material for desalination as well as the development of an aerogel material has been actively conducted.

The biggest advantage of the silica aerogel is super-insulation having a thermal conductivity of 0.300 W/m·K or less which is lower than that of an organic insulation material such as a typical Styrofoam. Also, the aerogel may address fire vulnerability and generation of toxic gas in case of fire, i.e., fatal weaknesses of a typical organic insulation material.

In order to prevent structural collapse due to a shrinkage phenomenon occurred during drying, the silica aerogel is prepared by a method in which a hydrophobic silica aerogel is prepared and a surface modifier is then removed by pyrolysis.

Specifically, the silica aerogel is prepared by the steps of: preparing a silica sol by hydrolysis of tetra ethyl ortho silicate (TEOS) or water glass with an acid catalyst, adding a basic catalyst thereto, and performing a condensation reaction to prepare a hydrophilic wet gel (first step); aging the wet gel (second step); performing solvent substitution in which the aged wet gel is put in an organic solvent to substitute water present in the wet gel with an organic solvent (third step); preparing a hydrophobic wet gel by adding a surface modifier to the solvent-substituted wet gel and performing a modification reaction for a long period of time (fourth step); preparing a hydrophobic silica aerogel by washing and drying the hydrophobic wet gel (fifth step); and pyrolyzing the aerogel (sixth step).

Recently, in order to further extend applications of silica aerogel, a plan of improving mechanical properties in addition to original properties of the silica aerogel has been reviewed, and, for example, a metal oxide-silica composite aerogel, in which a metal oxide is introduced, is being developed.

In general, the metal oxide-silica composite aerogel is being prepared by the steps of: adding a metal ion solution and an acid catalyst to a water glass solution and performing a reaction to prepare a metal oxide-silica composite wet gel (step 1); and washing and drying the wet gel (step 2) (see FIG. 1). With respect to the above preparation method, in order to allow a network structure of the aerogel to be well-formed, the reaction proceeds under a low acidity (pH) condition by adding the acid catalyst. However, since the metal oxide is formed within a high pH range, the metal oxide in the prepared metal oxide-silica composite aerogel is contained at a low content ratio. Thus, since an effect of improvement in mechanical properties by the introduction of the metal oxide is insignificant, it has a limitation in industrial applications.

Thus, there is a need to develop a method which may prepare a metal oxide-silica composite aerogel containing the metal oxide at a high content ratio.

DISCLOSURE OF THE INVENTION

Technical Problem

An aspect of the present invention provides a method of preparing a metal oxide-silica composite aerogel containing a large amount of the metal oxide while having good economic efficiency because production costs are reduced in comparison to the related art.

Another aspect of the present invention provides a metal oxide-silica composite aerogel prepared by the above preparation method.

Technical Solution

According to an aspect of the present invention, there is provided a method of preparing a metal oxide-silica composite aerogel including the steps of: adding a metal ion solution to a water glass solution and performing a primary reaction to prepare a metal oxide-silica composite agglomerate (step 1); adding a base catalyst to the agglomerate and performing a secondary reaction to prepare a metal oxide-silica composite wet gel (step 2); and drying the metal oxide-silica composite wet gel (step 3), wherein the primary reaction is performed under a condition in which pH<7.07, and the secondary reaction is performed under a condition in which pH>7.07, wherein the primary reaction and the secondary reaction are performed under a condition satisfying Equation 1 below:

$$4 \leq X-Y < 6 \qquad [\text{Equation 1}]$$

wherein, in Equation 1, X is the pH in the secondary reaction, and Y is the pH in the primary reaction.

According to another aspect of the present invention, there is provided a metal oxide-silica composite aerogel prepared by the above method.

Advantageous Effects

A method of preparing a metal oxide-silica composite aerogel according to the present invention may not only have good economic efficiency because production costs are relatively reduced in comparison to the related art, but may also adjust a metal oxide ratio to a high level while easily forming a uniform network structure by performing a primary reaction under an acidic condition and a secondary reaction under a basic condition and adjusting acidities during the primary reaction and the secondary reaction to have a difference within a predetermined range.

Furthermore, since a metal oxide-silica composite aerogel prepared by the preparation method according to the present invention may contain a high ratio of the metal oxide, mechanical properties may not only be excellent, but high specific surface area and low tap density characteristics may also be exhibited.

Thus, the preparation method according to an embodiment of the present invention and the metal oxide-silica composite aerogel prepared thereby are suitable for industries that need the method and the metal oxide-silica composite aerogel, for example, for the silica aerogel industry.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention provides a method of preparing a metal oxide-silica composite aerogel containing a metal oxide at a high content ratio.

Figure 1:
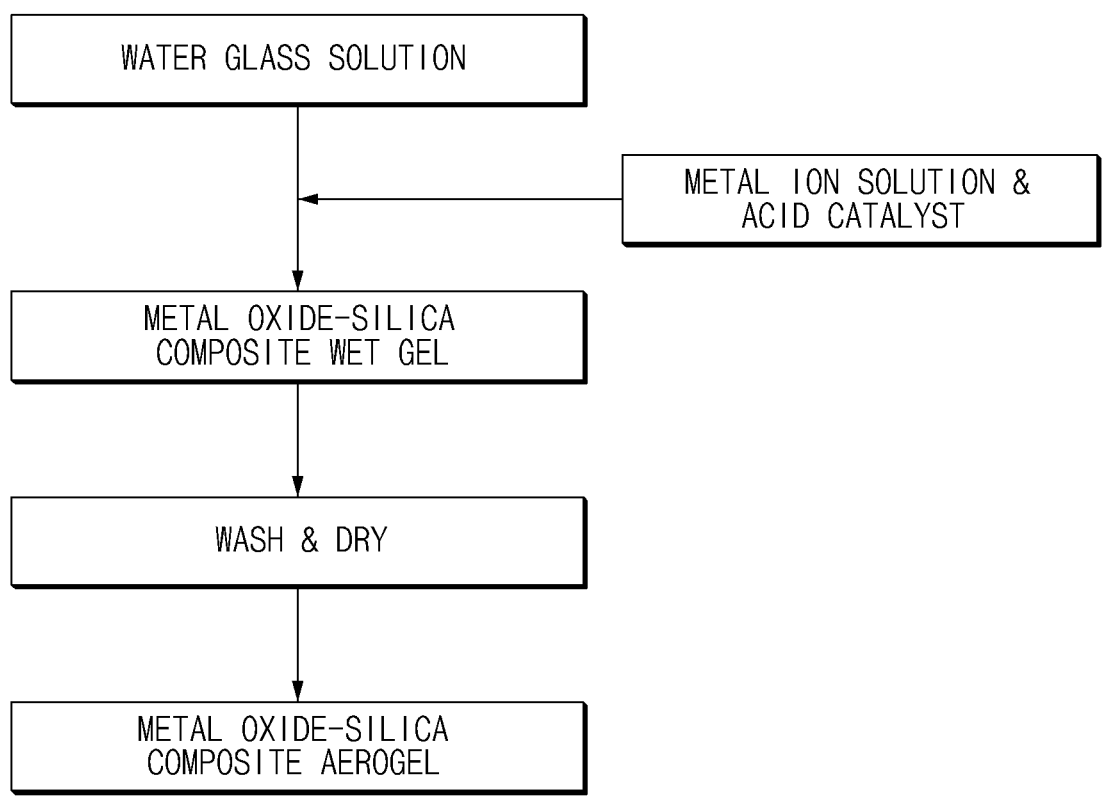
FIG. 1 schematically illustrates a flowchart of a conventional general method of preparing a metal oxide-silica composite aerogel.

In general, a metal oxide-silica composite aerogel is being prepared by the steps of: adding a metal ion solution and an acid catalyst to a water glass solution and performing a reaction to prepare a metal oxide-silica composite wet gel (step 1); and washing and drying the wet gel (step 2) (see FIG. 1). However, with respect to the above preparation method, in order to allow a network structure of the aerogel to be well-formed, the reaction proceeds under a low acidity (pH) condition by adding the acid catalyst, and the metal oxide in the prepared metal oxide-silica composite aerogel is contained at a low content ratio because the metal oxide is formed within a high pH range. Thus, since an effect of improvement in mechanical properties by the introduction of the metal oxide is insignificant, it has a limitation in industrial applications.

Therefore, the present invention provides a method of preparing a metal oxide-silica composite aerogel which may contain the metal oxide in a high content ratio while having high porosity characteristics, such as a high specific surface area and a high pore volume, because a network structure may also be easily formed.

Hereinafter, a method of preparing a metal oxide-silica composite aerogel according to an embodiment of the present invention will be described in detail with reference to FIG. 2.

Figure 2:
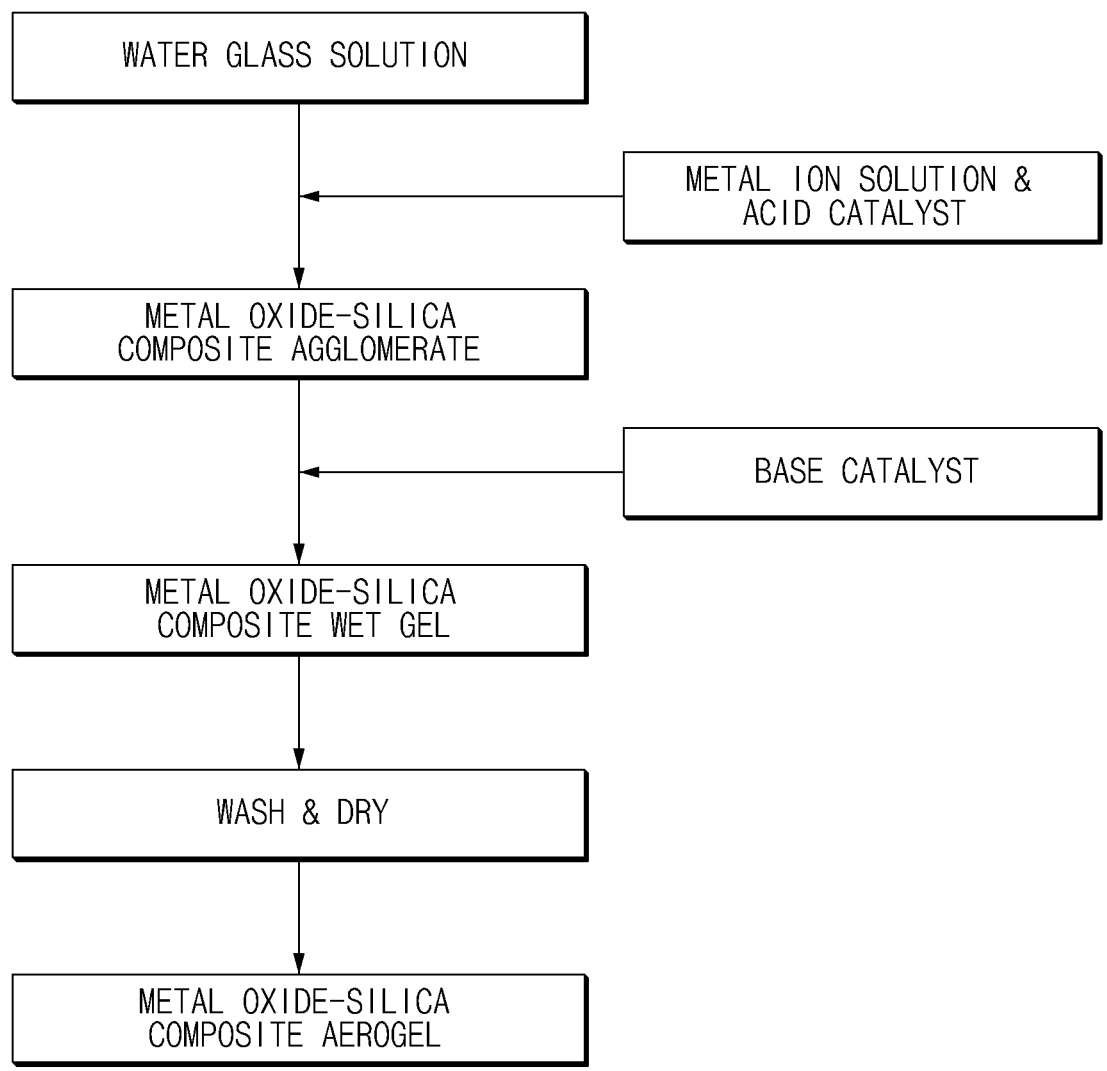
FIG. 2 schematically illustrates a flowchart of a method of preparing a metal oxide-silica composite aerogel according to an embodiment of the present invention.

FIG. 2 schematically illustrates a flowchart of the method of preparing a metal oxide-silica composite aerogel, which includes a primary reaction and a secondary reaction preformed under different pH conditions, according to the embodiment of the present invention.

The method of preparing a metal oxide-silica composite aerogel according to the embodiment of the present invention includes the steps of: adding a metal ion solution to a water glass solution and performing a primary reaction to prepare a metal oxide-silica composite agglomerate (step 1); adding a base catalyst to the agglomerate and performing a secondary reaction to prepare a metal oxide-silica composite wet gel (step 2); and drying the metal oxide-silica composite wet gel (step 3).

Also, the primary reaction is performed under a condition in which pH<7.07, and the secondary reaction is performed under a condition in which pH>7.07, wherein the primary reaction and the secondary reaction are performed under a condition satisfying the following Equation 1. That is, the primary reaction and the secondary reaction may be performed under different pH conditions.

$$4 \leq X - Y < 6 \qquad \text{[Equation 1]}$$

In Equation 1, X is the pH in the secondary reaction, and Y is the pH in the primary reaction.

Step 1 is a step of preparing a metal oxide-silica composite agglomerate and may be performed by adding a metal ion solution to a water glass solution and performing a primary reaction.

Specifically, step 1 is a step of preparing a metal oxide-silica composite agglomerate by adding the metal ion solution, after adding the water glass solution to a reactor, and performing the primary reaction. In this case, the metal oxide-silica composite agglomerate may denote a metal oxide-silica composite gel compound.

Herein, the expressions "primary reaction" may denote a sol-gel reaction, and the expression "sol-gel reaction" is a reaction that forms a network structure from silicon or a metal alkoxide unit precursor material, wherein the sol-gel reaction may denote a reaction in which, for example, after hydrolysis occurs in which silicon and water are reacted to form a hydroxy (—OH) functional group on metal, a reactant and a reactant are connected to each other and grow by condensation in which a single water molecule from two hydroxy functional groups simultaneously forms a metal-oxygen bond.

Herein, the network structure may denote a flat net-shaped structure, in which any specific polygons having one or more types of atomic arrangements are connected, or a structure in which a three-dimensional skeleton structure is formed by sharing vertices, edges, and faces of a specific polyhedron.

A concentration of water glass in the water glass solution may be in a range of 0.125 M to 3.0 M. In a case in which the water glass concentration is less than 0.125 M, since the agglomerate forms an excessively large porous network structure and a shrinkage phenomenon during drying is intensified, a metal oxide-silica composite aerogel having poor physical properties, for example, very high tap density and low porosity, may be formed. In a case in which the water glass concentration is greater than 3.0 M, since the agglomerate may not form a porous network structure but forms a dense structure, a specific surface area of the finally-prepared metal oxide-silica composite aerogel may be reduced.

Herein, the expression "water glass solution" may denote a dilute solution, in which distilled water is added to water glass and mixed, and the water glass may be sodium silicate ($Na_2SiO_3$) as an alkali silicate salt obtained by melting silicon dioxide ($SiO_2$) and alkali.

The metal ion solution may include a metal compound, an acid catalyst, and a solvent, and, specifically, may be a mixture which is prepared by dissolving the metal compound in the solvent and adding and mixing the acid catalyst. A concentration of metal ions in the metal ion solution may be in a range of 0.125 M to 3.0 M. Specifically, the metal ion solution may be a binary metal ion solution including calcium ions ($Ca^{2+}$) and magnesium ions ($Mg^{2+}$), and, in this case, a molar ratio of the calcium ion ($Ca^{2+}$) to the magnesium ion ($Mg^{2+}$) may be in a range of 1:0.3 to 1:3.0. That is, the metal ion solution may be one which is prepared by dissolving a calcium compound and a magnesium compound in the solvent, and the calcium compound and the magnesium compound may be a hydrate of calcium chloride and a hydrate of magnesium chloride, respectively. Specifically, the calcium compound may be calcium chloride dihydrate ($CaCl_2.2H_2O$), and the magnesium compound may be magnesium chloride hexahydrate ($MgCl_2.6H_2O$). Also, the solvent is not particularly limited as long as it may sufficiently dissolve the calcium compound and the magnesium compound, but, for example, may be distilled water.

Furthermore, the metal ion solution may have a pH of 0.1 to 4, and the pH may be adjusted by the acid catalyst included in the metal ion solution.

Specifically, as described above, the metal ion solution may be a mixture, which is prepared by dissolving the metal compound in the solvent and adding and mixing the acid catalyst, and a pH value before the addition of the acid catalyst may be in a range of 8 to 11. That is, the metal ion solution may have the above pH range by including the acid catalyst, and thus, the primary reaction to be described later may be easily performed. An amount of the acid catalyst in the metal ion solution is not particularly limited, and the acid catalyst may be included in an amount such that the pH value of the metal ion solution is within the above range.

The acid catalyst is not particularly limited, but, for example, may be at least one selected from the group consisting of hydrochloric acid, nitric acid, acetic acid, sulfuric acid, and hydrofluoric acid.

Also, the metal ion solution may be added in an amount such that the metal ions in the solution and the water glass in the water glass solution may be easily reacted, and, specifically, the metal ion solution may be added so that a volume ratio of the metal ion solution to the water glass solution is in a range of 5:1 to 1:5. For example, the metal ion solution may be added so that the volume ratio of the metal ion solution to the water glass solution is 1:1. In a case in which the metal ion solution is added to the water glass solution in an amount to achieve the above volume ratio range, since the water glass solution and metal ion solution having different pH values are mixed to create a pH range favorable to the primary reaction, the metal oxide-silica composite agglomerate may be easily prepared.

Furthermore, the metal ion solution may be added so that a molar ratio of silicon (Si) in the water glass solution to the metal ions ($Mg^{2+}$ and $Ca^{2+}$) in the metal ion solution is in a range of 1:0.3 to 1:2.5. In a case in which the metal ion solution is used to satisfy the above condition, since the water glass solution and the metal ion solution are mixed to create a pH range favorable to the primary reaction, the metal oxide-silica composite agglomerate may be easily formed.

In this case, as described above, the primary reaction may be performed under the condition in which pH<7.07, and, specifically, may be performed in a pH range of 4 to 7, wherein the primary reaction as well as the secondary reaction to be described later may be performed under the condition satisfying Equation 1. In this case, as described above, the pH of the primary reaction may be adjusted by mixing the water glass solution and the metal ion solution having different pHs under the above condition.

Also, the primary reaction is not particularly limited, but, for example, may be performed while stirring, and the stirring may be performed by rotating at 100 rpm to 500 rpm using a magnetic bar or mechanical mixer.

Step 2 is a step for preparing a metal oxide-silica composite wet gel containing the metal oxide at a high content ratio, wherein step 2 may be performed by adding a base catalyst to the metal oxide-silica composite agglomerate and performing a secondary reaction.

Specifically, the secondary reaction may denote a metal oxide impregnation reaction, and, for example, is a reaction of further impregnating metal ions which were dissolved out due to the low pH of the primary reaction, wherein since the pH is increased to form a basic condition by adding the base catalyst to the metal oxide-silica composite agglomerate, the impregnation reaction may be induced.

As described above, the secondary reaction may be performed under the condition in which pH>7.07, and, specifically, may be performed in a pH range of 8.5 to 10, wherein the secondary reaction as well as the above-described primary reaction may be performed under the condition satisfying Equation 1. In this case, the pH of the secondary reaction may be adjusted by the base catalyst, and the base catalyst may be used in an amount such that the pH of the secondary reaction is within the above-described range.

The base catalyst is not particularly limited, but, for example, may be at least one selected from the group consisting of sodium hydroxide (NaOH), ammonia water ($NH_4OH$), and potassium hydroxide (KOH). Specifically, the base catalyst may be sodium hydroxide.

Step 3 is a step of drying the metal oxide-silica composite wet gel for the preparation of the metal oxide-silica composite aerogel.

In this case, in the preparation method according to the embodiment of the present invention, a step of washing may be further performed before the drying, and the washing is to obtain a high purity metal oxide-silica composite aerogel by removing impurities (e.g., unreacted products, by-products, etc.) generated during the reaction, wherein the washing is not particularly limited and may be performed by a conventional method in the art.

For example, the washing may be performed by adding distilled water or an organic solvent to the metal oxide-silica composite wet gel and stirring for 20 minutes to 1 hour, and the organic solvent is not particularly limited, but, for example, may be alcohol. In a case in which the washing is performed by using the organic solvent, since water present in the metal oxide-silica composite wet gel is substituted with alcohol having a relatively low surface tension, the shrinkage phenomenon occurred during drying may be further suppressed.

The drying may be performed by atmospheric pressure drying at a temperature of 100° C. to 190° C. for 1 hour to 4 hours after a water layer is separated and removed from the metal oxide-silica composite wet gel.

As described above, since the preparation method according to the embodiment of the present invention includes the primary reaction and the secondary reaction which are performed by adjusting the pH under the specific condition, the method according to the embodiment of the present invention may prepare a metal oxide-silica composite aerogel containing the metal oxide at a high content ratio while easily forming the network structure.

Also, the present invention provides a metal oxide-silica composite aerogel prepared by the above preparation method.

The aerogel according to an embodiment of the present invention may be one in which silica is doped with metal oxide, and the metal oxide may be a combination of magnesium oxide (MgO) and calcium oxide (CaO). That is, the aerogel may include magnesium oxide (MgO), calcium oxide (CaO), and silica ($SiO_2$).

Herein, the doping denotes that a limited amount of a foreign material is added to a pure material, and, for example, may denote that the metal oxide is bonded in a network structure of the silica.

Since the metal oxide-silica composite aerogel according to the embodiment of the present invention is prepared by the method as described above, a ratio of the metal ions may be significantly increased in comparison to a conventional metal oxide-silica composite aerogel even if the metal oxide-silica composite aerogel is prepared by adding the same ratio of metal ions.

Specifically, the metal oxide-silica composite aerogel according to the embodiment of the present invention may have a molar ratio of metals (Mg and Ca) to silicon (Si) in the aerogel of 0.2 to 2.0, particularly, 0.9 to 2.0. Also, the metal oxide-silica composite aerogel may include 15 wt % to 60 wt % of the metal oxide in the aerogel.

Furthermore, the metal oxide-silica composite aerogel may have a specific surface area of greater than 150 $m^2/g$ and equal to or less than 500 $m^2/g$ and, specifically, the specific surface area may be in a range of 250 $m^2/g$ to 500 $m^2/g$.

Also, the metal oxide-silica composite aerogel may have a tap density of 0.07 g/ml to 0.30 g/ml, and, specifically, the tap density may be in a range of 0.07 g/ml to 0.10 g/ml.

For example, the metal oxide-silica composite aerogel may have a specific surface area of greater than 300 $m^2/g$ and equal to or less than 500 $m^2/g$ and a tap density of 0.07 g/ml or more to less than 0.1 g/ml.

Herein, with respect to the molar ratio of the metals to the silicon in the metal oxide-silica composite aerogel, elemental analysis of the aerogel was performed and the molar ratio was calculated from the result of the elemental analysis. Specifically, the elemental analysis was performed by using an energy dispersive spectrometer (EDS, Oxford INCA X-ray Microanalysis System) in a field emission-scanning electron microscope (FE-SEM, S-4800, HITACHI High-Technologies Corporation), and an average value was obtained by performing the analysis five times for each sample.

The tap density was measured using a tap density tester (Jolting Volumeter Type STAVII) after tapping 2,500 times, and the specific surface area was measured based on the amounts of nitrogen, which were adsorbed and desorbed according to partial pressure ($0.11<p/p_o<1$), using an ASAP 2010 analyzer (Micromeritics).

Hereinafter, the present invention will be described in more detail, according to the following examples and experimental examples. However, the following examples and experimental examples are merely presented to exemplify the present invention, and the scope of the present invention is not limited thereto.

Example 1

A metal oxide-silica composite aerogel was prepared through steps illustrated in FIG. 2.

Specifically, a metal ion solution (metal ion concentration 1.0 M, $Mg^{2+}:Ca^{2+}=2:1$ molar ratio) including hydrochloric acid was added to a water glass solution (water glass concentration 1.0 M) in an amount such that a molar ratio (Me/Si) of metal ions (Me) in the metal ion solution to silicon (Si) in the water glass solution was 0.75, and a primary reaction was performed to prepare a metal oxide-silica composite agglomerate. Sodium hydroxide was added to the agglomerate and a secondary reaction was performed to prepare a metal oxide-silica composite wet gel. In this case, a pH during the primary reaction before the addition of the sodium hydroxide was 5, and a pH during the secondary reaction after the addition of the sodium hydroxide was 9.2. The prepared metal oxide-silica composite wet gel was washed with ethanol, solid/liquid separation was then performed at a water content of less than 100%, and atmospheric pressure drying was performed in an oven at 150° C. for 1 hour to prepare a metal oxide-silica composite aerogel.

Example 2

A metal oxide-silica composite aerogel was prepared in the same manner as in Example 1 except that a metal ion solution (metal ion concentration 1.0 M, $Mg^{2+}:Ca^{2+}=2:1$ molar ratio) was added in an amount such that a molar ratio of metal ions in the metal ion solution to silicon in the water glass solution was 1.0, and a pH during the secondary reaction was 9.0.

Example 3

A metal oxide-silica composite aerogel was prepared in the same manner as in Example 1 except that a metal ion solution (metal ion concentration 1.0 M, $Mg^{2+}:Ca^{2+}=2:1$ molar ratio) was added in an amount such that a molar ratio of metal ions in the metal ion solution to silicon in a water glass solution was 0.333, and a pH during the secondary reaction was 9.3.

Example 4

A metal oxide-silica composite aerogel was prepared in the same manner as in Example 1 except that a metal ion solution (metal ion concentration 1.0 M, $Mg^{2+}:Ca^{2+}=2:1$ molar ratio) was added in an amount such that a molar ratio of metal ions in the metal ion solution to silicon in the water glass solution was 0.5, and a pH during the secondary reaction was 9.1.

Example 5

A metal oxide-silica composite aerogel was prepared in the same manner as in Example 1 except that a metal ion solution (metal ion concentration 1.0 M, $Mg^{2+}:Ca^{2+}=2:1$ molar ratio) was added in an amount such that a molar ratio of metal ions in the metal ion solution to silicon in the water glass solution was 1.5, and a pH during the secondary reaction was 9.3.

Example 6

A metal oxide-silica composite aerogel was prepared in the same manner as in Example 1 except that a metal ion solution (metal ion concentration 1.0 M, $Mg^{2+}:Ca^{2+}=2:1$ molar ratio) was added in an amount such that a molar ratio of metal ions in the metal ion solution to silicon in the water glass solution was 2.0, and a pH during the secondary reaction was 9.4.

Example 7

A metal oxide-silica composite aerogel was prepared in the same manner as in Example 1 except that a metal ion solution (metal ion concentration 1.0 M, $Mg^{2+}:Ca^{2+}=2:1$ molar ratio) was added in an amount such that a molar ratio of metal ions in the metal ion solution to silicon in the water glass solution was 1.0, a pH during the primary reaction was 4.5, and a pH during the secondary reaction was 10.0. In this case, the pH during the primary reaction was adjusted by adding separate hydrochloric acid, and the pH during the secondary reaction was adjusted by the amount of the sodium hydroxide added.

Comparative Example 1

A metal oxide-silica composite aerogel was prepared through steps illustrated in FIG. 1.

Specifically, a metal ion solution (metal ion concentration 1.0 M, $Mg^{2+}:Ca^{2+}=2:1$ molar ratio) including hydrochloric acid was added to a water glass solution (water glass concentration 1.0 M) in an amount such that a molar ratio of metal ions in the metal ion solution to silicon in the water glass solution was 0.5, and a reaction was performed to prepare a metal oxide-silica composite wet gel. In this case, the reaction was performed at a pH of 5, and the pH after the completion of the reaction was 5.4. The metal oxide-silica composite wet gel was washed with ethanol, solid/liquid separation was then performed at a water content of less than 100%, and atmospheric pressure drying was performed in an oven at 150° C. for 1 hour to prepare a metal oxide-silica composite aerogel.

Comparative Example 2

A metal oxide-silica composite wet gel was prepared in the same manner as in Comparative Example 1 except that a metal ion solution (metal ion concentration 1.0 M, $Mg^{2+}:Ca^{2+}=2:1$ molar ratio) was added in an amount such that a molar ratio of metal ions in the metal ion solution to silicon in the water glass solution was 1.0, and a reaction was performed. In this case, the reaction was performed at a pH of 5, and the pH after the completion of the reaction was 5.5.

Comparative Example 3

A metal oxide-silica composite wet gel was prepared in the same manner as in Comparative Example 1 except that a metal ion solution (metal ion concentration 1.0 M, $Mg^{2+}:Ca^{2+}=2:1$ molar ratio) was added in an amount such that a molar ratio of metal ions in the metal ion solution to silicon in the water glass solution was 1.5, and a reaction was performed. In this case, the reaction was performed at a pH of 5, and the pH after the completion of the reaction was 5.2.

Comparative Example 4

A metal oxide-silica composite aerogel was prepared in the same manner as in Example 2 except that the pH during the primary reaction was adjusted to 3.1, and the pH during the secondary reaction was adjusted to 9.1. In this case, the pH during the primary reaction was adjusted by adding a separate hydrochloric acid solution, and the pH during the secondary reaction was adjusted by the amount of the sodium hydroxide added.

Comparative Example 5

A metal oxide-silica composite aerogel was prepared in the same manner as in Example 2 except that the pH during the primary reaction was adjusted to 5, and the pH during the secondary reaction was adjusted to 8.5. In this case, the pH during the secondary reaction was adjusted by the amount of the sodium hydroxide added.

Comparative Example 6

A metal oxide-silica composite aerogel was prepared in the same manner as in Example 2 except that the pH during the primary reaction was adjusted to 3.1, and the pH during the secondary reaction was adjusted to 5.2. In this case, the pH during the primary reaction was adjusted by adding separate hydrochloric acid, and the pH during the secondary reaction was adjusted by the amount of the sodium hydroxide added.

Comparative Example 7

A metal oxide-silica composite aerogel was prepared in the same manner as in Example 2 except that the pH during the primary reaction was adjusted to 9, and the pH during the secondary reaction was adjusted to 5.1. In this case, the pH during the primary reaction was adjusted by adding separate sodium hydroxide, and the pH during the secondary reaction was adjusted by adding separate hydrochloric acid.

Experimental Example

In order to compare physical properties of the metal oxide-silica composite aerogels prepared in Examples 1 to 7 and Comparative Examples 1 to 7, elements in each aerogel were analyzed, and tap density (g/ml) and specific surface area (Brunauer-Emmett-Teller (BET), $m^2/g$) were measured. The results thereof are presented in Table 1 below.

(1) Elemental Analysis

Elemental analysis was performed by using an energy dispersive spectrometer (EDS, Oxford INCA X-ray Microanalysis System) in a field emission-scanning electron microscope (FE-SEM, S-4800, HITACHI High-Technologies Corporation), and an average value was obtained by performing the analysis five times for each sample.

(2) Tap Density (g/ml)

Tap density was measured using a tap density tester (Jolting Volumeter Type STAVII) after tapping 2,500 times.

(3) Specific Surface Area (BET, $m^2/g$)

A specific surface area was measured based on the amounts of nitrogen, which were adsorbed and desorbed according to partial pressure ($0.11<p/p_o<1$), using an ASAP 2010 analyzer (Micromeritics).

TABLE 1

| Category | Elemental analysis | | | Tap density (g/ml) | Specific surface area (m²/g) |
|---|---|---|---|---|---|
| | Silicon (Si, wt %) | Metal (Mg + Ca, wt %) | Metal/Silicon (Mg + Ca/Si) | | |
| Example 1 | 18.080 | 11.190 | 0.619 | 0.07 | 330 |
| Example 2 | 17.300 | 15.880 | 0.918 | 0.08 | 380 |
| Example 3 | 21.649 | 6.215 | 0.287 | 0.09 | 350 |
| Example 4 | 21.317 | 9.070 | 0.425 | 0.08 | 330 |
| Example 5 | 14.846 | 20.655 | 1.391 | 0.08 | 420 |
| Example 6 | 13.536 | 25.340 | 1.872 | 0.07 | 400 |
| Example 7 | 19.428 | 17.074 | 0.879 | 0.09 | 400 |
| Comparative Example 1 | 26.393 | 0.249 | 0.009 | 0.12 | 320 |
| Comparative Example 2 | 28.700 | 0.330 | 0.011 | 0.10 | 300 |
| Comparative Example 3 | 20.305 | 0.448 | 0.022 | 0.11 | 315 |
| Comparative Example 4 | 14.598 | 11.857 | 0.812 | 0.21 | 150 |
| Comparative Example 5 | 15.394 | 3.348 | 0.217 | 0.14 | 280 |
| Comparative Example 6 | 16.986 | 0.474 | 0.028 | 0.18 | 175 |
| Comparative Example 7 | 18.048 | 0.377 | 0.021 | 0.13 | 250 |

As illustrated in Table 1, it was confirmed that the metal oxide-silica composite aerogels of Examples 1 to 7 prepared according to the embodiment of the present invention contained a large amount of the metal oxide while having high specific surface areas and low tap densities in comparison to the metal oxide-silica composite aerogels of Comparative Examples 1 to 7.

Specifically, as a result of comparing the metal oxide-silica composite aerogel of Example 2 prepared through the steps as illustrated in FIG. 2 according to the embodiment of the present invention with the metal oxide-silica composite aerogel of Comparative Example 2, although the molar ratios of the metal ions in the metal ion solution to the silica in the water glass solution used were the same, with respect to the metal oxide-silica composite aerogel of Example 2, a ratio of the metals from the elemental analysis was significantly increased about 48 times (increased from 0.330 wt % to 15.880 wt %) while the tap density was decreased by 20% (decreased from 0.10 g/ml to 0.08 g/ml) and the specific surface area was increased by about 27% (increased from 300 m²/g to 380 m²/g) in comparison to the metal oxide-silica composite aerogel of Comparative Example 2.

Also, as a result of respectively comparing the metal oxide-silica composite aerogels of Comparative Example 4 (condition in which X-Y=6) and Comparative Example 5 (condition in which X-Y=3.5), which were prepared through the steps as illustrated in FIG. 2 according to the embodiment of the present invention, but the primary reaction and the secondary reaction were performed under a condition not satisfying Equation 1, with the metal oxide-silica composite aerogels of Example 2 (condition in which X-Y=4) and Example 7 (condition in which X-Y=5.5), it was confirmed that the metal oxide-silica composite aerogels of Examples 2 and 7 not only had the increased ratios of the metals but also had the significantly decreased tap densities and the significantly increased specific surface areas in comparison to the metal oxide-silica composite aerogels of Comparative Examples 4 and 5. This indicated that, in the method of preparing a metal oxide-silica composite aerogel according to the embodiment of the present invention, a metal oxide-silica composite aerogel having desired physical properties may be prepared by performing the primary reaction and the secondary reaction under different pH conditions and under a condition in which a difference between the pHs of the primary reaction and the secondary reaction was within a predetermined range.

The invention claimed is:

1. A method of preparing a metal oxide-silica composite aerogel, the method comprising steps of:
   (1) adding a metal ion solution to a water glass solution and performing a primary reaction to prepare a metal oxide-silica composite agglomerate;
   (2) adding a base catalyst to the agglomerate and performing a secondary reaction to prepare a metal oxide-silica composite wet gel; and
   (3) drying the metal oxide-silica composite wet gel,
   wherein the primary reaction is performed under a condition in which pH<7.07, and
   the secondary reaction is performed under a condition in which pH>7.07,
   wherein the primary reaction and the secondary reaction are performed under a condition satisfying Equation 1:

$$4 \leq X-Y < 6 \qquad \text{[Equation 1]}$$

wherein, in Equation 1, X is the pH in the secondary reaction, and Y is the pH in the primary reaction.

2. The method of claim 1, wherein a concentration of water glass in the water glass solution is in a range of 0.125 M to 3.0 M.

3. The method of claim 1, wherein a concentration of metal ions in the metal ion solution is in a range of 0.125 M to 3.0 M.

4. The method of claim 1, wherein the metal ion solution is a binary metal ion solution including calcium ions ($Ca^{2+}$) and magnesium ions ($Mg^{2+}$).

5. The method of claim 4, wherein a molar ratio of the calcium ion ($Ca^{2+}$) to the magnesium ion ($Mg^{2+}$) in the metal ion solution is in a range of 1:0.3 to 1:3.0.

6. The method of claim 1, wherein the metal ion solution comprises an acid catalyst.

7. The method of claim 6, wherein the acid catalyst comprises at least one selected from the group consisting of hydrochloric acid, nitric acid, acetic acid, sulfuric acid, and hydrofluoric acid.

8. The method of claim 1, wherein the metal ion solution is added so that a molar ratio of silicon in the water glass solution to metal ions in the metal ion solution is in a range of 1:0.3 to 1:2.5.

9. The method of claim 1, wherein the primary reaction is performed in a pH range of 4 to 7.

10. The method of claim 1, wherein the secondary reaction is performed in a pH range of 8.5 to 10.

11. The method of claim 1, wherein the pH of the secondary reaction is adjusted by the base catalyst.

12. The method of claim 1, wherein the base catalyst comprises at least one selected from the group consisting of sodium hydroxide, ammonia, and potassium hydroxide.

13. The method of claim 1, wherein the drying of step (3) is performed by atmospheric pressure drying at a temperature of 100° C. to 190° C. for 1 hour to 4 hours.

14. A metal oxide-silica composite aerogel prepared by the method of claim 1, wherein the metal oxide comprises calcium oxide (CaO) and magnesium oxide (MgO).

15. The metal oxide-silica composite aerogel of claim 14, wherein a molar ratio of silicon (Si) in the aerogel to metallic elements is in a range of 1:0.2 to 1:2.0.

16. The metal oxide-silica composite aerogel of claim 14, wherein the aerogel comprises 15 wt % to 60 wt % of the metal oxide.

17. The metal oxide-silica composite aerogel of claim 14, wherein the aerogel has a specific surface area of greater than 150 $m^2/g$ and equal to or less than 500 $m^2/g$.

18. The metal oxide-silica composite aerogel of claim 14, wherein the aerogel has a tap density of 0.07 g/ml to 0.30 g/ml.

* * * * *